United States Patent [19]
Brosius et al.

[11] Patent Number: 5,371,144
[45] Date of Patent: Dec. 6, 1994

[54] PARTIALLY CROSSLINKED PLASTICS MATERIALS OF PROPYLENE COPOLYMERS

[75] Inventors: Sibylle Brosius, Ludwigshafen; Harald Schwager, Speyer; Susanne Hahn, Mannheim; Bernd L. Marczinke, Speyer, all of Germany

[73] Assignee: BASF Aktiengesellschaft, Ludwigshafen, Germany

[21] Appl. No.: 25,861

[22] Filed: Mar. 3, 1993

[30] Foreign Application Priority Data

Mar. 7, 1992 [DE] Germany .............................. 4207313

[51] Int. Cl.$^5$ .............................................. C08F 8/00
[52] U.S. Cl. .................................. 515/193; 525/240
[58] Field of Search ..................................... 525/193

[56] References Cited

U.S. PATENT DOCUMENTS

| | | |
|---|---|---|
| 3,646,155 | 2/1972 | Scott . |
| 4,652,326 | 3/1987 | Spielau et al. . |
| 5,244,976 | 9/1993 | Brosius et al. ....................... 525/193 |

FOREIGN PATENT DOCUMENTS

| | | |
|---|---|---|
| 1406680 | 9/1975 | United Kingdom . |
| 1408154 | 10/1975 | United Kingdom . |

Primary Examiner—Bernard Lipman
Attorney, Agent, or Firm—Keil & Weinkauf

[57] ABSTRACT

Partially crosslinked plastics materials having a melt flow index of from 0.1 to 100 g/10 min at 230° C. and under a weight of 2.16 kg, containing a) a polymer of from 25 to 97% by weight of a propylene copolymer (I) which contains from 0.1 to 15% by weight of polymerized $C_2$–$C_{10}$-alk-1-enes and of from 3 to 75% by weight of a further propylene copolymer (II) which contains from 15 to 80% by weight of polymerized $C_2$–$C_{10}$-alk-1-enes and b) an organosilane compound of the following formula (I)

$$A_{4-n}SiR_n \qquad (I)$$

where the radicals A are identical or different and are each an acrylate or methacrylate or vinyl, the radicals R are identical or different and are each $C_1$–$C_8$-alkoxy or $C_1$–$C_8$-acetoxy and n is 1, 2 or 3, are obtainable by reacting the polymer a) with the organosilane compound b) in the presence of a free radical initiator and a condensation catalyst at from 180 to 280° C. and from 1 to 100 bar and in the course of average residence times of the reaction mixture of from 0.2 to 10 minutes.

The novel plastics materials have in particular improved processability and thermoformability, a lower sealing temperature and better white fracture behavior.

7 Claims, No Drawings

PARTIALLY CROSSLINKED PLASTICS MATERIALS OF PROPYLENE COPOLYMERS

The present invention relates to partially crosslinked plastics materials having a melt flow index of from 0.1 to 100 g/10 min at 230° C. and under a weight of 2.16 kg, containing a) a polymer of from 25 to 97% by weight of a propylene copolymer (I) which contains from 0.1 to 15% by weight of polymerized $C_2$–$C_{10}$-alk-1-enes and of from 3 to 75% by weight of a further propylene copolymer (II) which contains from 15 to 80% by weight of polymerized $C_2$–$C_{10}$-alk-1-enes and b) an organosilane compound of the following formula (I)

$$A_{4-n}SiR_n \qquad (I)$$

where the radicals A are identical or different and are each an acrylate or methacrylate or vinyl, the radicals R are identical or different and are each $C_1$–$C_8$-alkoxy or $C_1$–$C_8$-acetoxy and n is 1, 2 or 3,
obtainable by reacting the polymer a) with the organosilane compound b) in the presence of a free radical initiator and a condensation catalyst at from 180° to 280° C., at from 1 to 100 bar and in the course of average residence times of the reaction mixture of from 0.2 to 10 minutes.

The present invention furthermore relates to a process for the preparation of the novel partially crosslinked plastics materials and to their use for the production of films and moldings.

It is known that polyethylenes and copolymers of ethylene with vinylsilanes can first be grafted and then crosslinked with the aid of a silanol condensation catalyst (DE-A 2 611 491, U.S. Pat. No. 3,646,155, GB-A 1 406 680, GB-A 1 408 154). This gives polymers having improved mechanical properties, in particular higher strength.

The crosslinking of polypropylene or copolymers of propylene with unsaturated silanes in the presence of a silanol condensation catalyst and a peroxide is furthermore described in DE-A 33 27 149 and DE-A 35 20 106. The polymers obtained possess good low temperature impact strength and high dimensional stability.

Compared with uncrosslinked polymers, crosslinked polymers have the advantage of higher mechanical stability. However, owing to the lower melt flow, crosslinked materials can no longer be thermally molded by the methods conventionally used in plastics technology (H. G. Elias, Makromoleküle, Verlag Hüthig & Wepf, 4th Edition, pages 1000–1003).

For processing polymers, it is therefore necessary to ensure that the degree of crosslinking of the polymers is not too high, so that they can still be molded using the apparatuses conventionally employed in plastics technology. Particularly for many applications of polymers in the films sector, it is important in this context that said polymers have a very low sealing temperature. The sealing temperature is the minimum temperature at which the film begins to adhere to a suitable substrate under gentle pressure. The DSC melting point is a measure of the sealing temperature.

Polymers having reduced white fracture are also required for the production of many films and moldings, white fracture meaning the white color which occurs in many plastics under mechanical load.

It is an object of the present invention to provide a plastics material which combines the advantages of crosslinked polymers with respect to their mechanical strength with those of uncrosslinked polymers with respect to their easy processibility and furthermore has a very low sealing temperature and reduced white fracture.

We have found that this object is achieved by the partially crosslinked plastics materials defined at the outset.

The novel partially crosslinked plastics materials have a melt flow index of from 0.1 to 100 g/10 min at 230° C. and under a weight of 2.16 kg. The melt flow index corresponds to the amount of polymer which is forced in the course of 10 minutes, at 230° C. and under a weight of 2.16 kg, out of the test apparatus standardized according to DIN 53,735. Particularly preferred partially crosslinked plastics materials are those whose melt flow index is from 0.1 to 50 g/10 min at 230° C. and under a weight of 2.16 kg.

The novel partially crosslinked plastics materials contain a polymer a) of from 25 to 97% by weight of a propylene copolymer (I), which contains from 0.1 to 15% by weight of $C_2$–$C_{10}$-alk-1-enes, and of from 3 to 75% by weight of a further propylene copolymer (II), which contains from 15 to 80% by weight of polymerized $C_2$–$C_{10}$-alk-1-enes. Preferred plastics materials are those whose polymer a) consists of from 35 to 95% by weight of a propylene copolymer (I) containing from 0.2 to 12% by weight of polymerized $C_2$–$C_{10}$-alk-1-enes and from 5 to 65% by weight of a propylene copolymer (II) containing from 20 to 75% by weight of polymerized $C_2$–$C_{10}$-alk-1-enes. Among these plastics materials, those whose polymer a) consists of from 40 to 93% by weight of a propylene copolymer (I) containing from 0.3 to 9% by weight of polymerized $C_2$–$C_{10}$-alk-1-enes and of from 7 to 60% by weight of a propylene copolymer (II) containing from 25 to 70% by weight of polymerized $C_2$–$C_{10}$-alk-1-enes are particularly preferred.

Polymerized $C_2$–$C_{10}$-alk-1-enes in this context are in particular ethylene, but-1-ene, pent-1-ene, hex-1-ene, hept-1-ene and oct-1-ene or mixtures of these comonomers, ethylene or but-1-ene being preferably used.

The preparation of the polymer a) to be used according to the invention can be carried out, either batchwise or preferably continuously, in the conventional reactors used for the polymerization of propylene. Suitable reactors include continuously operated stirred kettles, and a plurality of stirred kettles connected in series may also be used. The reactors contain a fixed bed of finely divided polymer, which is usually kept in motion by stirring.

The process can be carried out using the Ziegler-Natta catalysts usually employed in polymerization technology. In addition to a titanium-containing solid component, said catalysts contain, inter alia, cocatalysts. Suitable cocatalysts are aluminum compounds together with electron donor compounds.

For the preparation of the titanium-containing solid component, the titanium compounds used are in general halides or alcoholates of trivalent or tetravalent titanium, the chlorides of titanium, in particular titanium tetrachloride, being preferred. The titanium-containing solid component advantageously contains a finely divided carrier, silicas and aluminas as well as aluminum silicates of the empirical formula $SiO_2.aAl_2O_3$, where a is from 0.001 to 2, in particular from 0.01 to 0.5, having proven suitable for this purpose.

The preferably used carriers have a particle diameter of from 0.1 to 1,000 μm, in particular from 10 to 300 μm, a pore volume of from 0.1 to 10, in particular from 1.0 to 5.0, cm³/g and a specific surface area of from 10 to 1,000, in particular from 100 to 500, m²/g.

Compounds of magnesium are also among the compounds used in the preparation of the titanium-containing solid component. Magnesium halides, magnesium alkyls and magnesium aryls as well as alkoxymagnesium and aryloxymagnesium compounds are particularly suitable as such compounds, magnesium dichloride, magnesium dibromide and di-$C_1$-$C_{10}$-alkylmagnesium compounds being preferably used. The titanium-containing solid component may also contain halogen, preferably chlorine or bromine.

The titanium-containing solid component furthermore contains electron donor compounds, for example mono- or polyfunctional carboxylic acids, carboxylic anhydrides and carboxylates, ketones, ethers, alcohols, lactones and organophosphorus and organosilicon compounds. Preferably used electron donor compounds in the titanium-containing solid component are phthalic acid derivatives of the general formula II

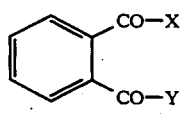
II where X and Y are each chlorine or $C_1$-$C_{10}$-alkoxy or together are oxygen. Particularly preferred electron donor compounds are phthalates in which X and Y are each $C_1$-$C_8$-alkoxy, for example methoxy, ethoxy, propoxy or butoxy.

Other preferred electron donor compounds in the titanium-containing solid component include diesters of 3- or 4-membered, unsubstituted or substituted cycloalkyl-1,2-dicarboxylic acids, and monoesters of unsubstituted or substituted benzophenone-2-carboxylic acids. The hydroxy compounds used in these esters are the alcohols conventionally employed in esterification reactions, including $C_1$-$C_{15}$-alkanols, $C_5$-$C_7$-cycloalkanols, which in turn may carry $C_1$-$C_{10}$-alkyl groups, and phenols, naphthols and $C_1$-$C_{10}$-alkyl derivatives of these compounds.

The titanium-containing solid component can be prepared by conventional methods. Examples of these are described in, inter alia, EP-A 45 975, EP-A 86 473, EP-A 171 200, GB-A 2 111 066 and U.S. Pat. No. 4,857,613.

In the preparation of the titanium-containing solid component, the following three-stage process is preferably used.

In the first stage, a solution of the magnesium-containing compound in a liquid alkane is first added to a finely divided carrier, preferably silica or $SiO_2 \cdot aAl_2O_3$ having a water content of from 0.5 to 5% by weight, where a is from 0.001 to 2, in particular from 0.01 to 0.5, after which this mixture is stirred for from 0.5 to 5 hours at from 10° to 120° C.

From 0.1 to 1 mol of magnesium compound is preferably used per mol of the carrier. A halogen or a hydrogen halide, in particular chlorine or hydrogen chloride, is then added, with constant stirring, in at least a twofold, preferably at least a five-fold, molar excess, based on the magnesium-containing compound. After from about 30 to 120 minutes, the solid is separated off from the liquid phase.

In the second stage, the product obtained in this manner is introduced into a liquid alkane, after which a $C_1$-$C_8$-alkanol, in particular ethanol, a halide or an alcoholate of trivalent or tetravalent titanium, in particular titanium tetrachloride, and an electron donor compound, in particular a phthalic acid derivative of the general formula II, are added. From 1 to 5, in particular from 2 to 4, mol of alkanol, from 2 to 20, in particular from 4 to 10, mol of the trivalent or tetravalent titanium and from 0.01 to 1, in particular from 0.1 to 1.0, mol of the electron donor compound are used per mol of magnesium of the solid obtained from the first stage. This mixture is stirred for at least one hour at from 10° to 150° C. and the solid substance thus obtained is then filtered off and is washed with a liquid alkane, preferably with hexane or heptane.

In the third stage, the solid obtained from the second stage is extracted for a few hours at from 100° to 150° C. with excess titanium tetrachloride or with an excess of a solution of titanium tetrachloride in an inert solvent, preferably an alkylbenzene, the solvent containing at least 5% by weight of titanium tetrachloride. Thereafter, the product is washed with a liquid alkane until the wash liquid contains less than 2% by weight of titanium tetrachloride.

The titanium-containing solid component obtainable in this manner is used with cocatalysts as a Ziegler-Natta catalyst system. Suitable cocatalysts are aluminum compounds and electron donor compounds.

Suitable aluminum compounds in addition to trialkylaluminum are also compounds in which the alkyl group has been replaced with an alkoxy group or with a halogen atom, for example with chlorine or bromine.

Trialkylaluminum compounds whose alkyl groups are each 1 to 8 carbon atoms, for example trimethyl-, triethyl- or methyldiethylaluminum, are preferably used.

In addition to the aluminum compound, electron donor compounds, for example mono- or polyfunctional carboxylic acids, carboxylic anhydrides and carboxylates, ketones, ethers, alcohols, lactones and organophosphorus and organosilicon compounds, are preferably also used as further cocatalysts. Particularly suitable electron donor compounds are organosilicon compounds of the general formula III

III where the radicals $R^1$ are identical or different and are each $C_1$-$C_{20}$-alkyl, a 5-membered to 7-membered cycloalkyl group which in turn may carry a $C_1$-$C_{10}$-alkyl group, or $C_6$-$C_{20}$-aryl or arylalkyl, the radicals $R^2$ are identical or different and are each $C_1$-$C_{20}$-alkyl and n is 1, 2 or 3. Particularly preferred compounds are those in which $R^1$ is $C_1$-$C_8$-alkyl or a 5-membered to 7-membered group, $R^2$ is $C_1$-$C_4$-alkyl and n is 1 or 2.

Among these compounds, dimethoxydiisopropylsilane, dimethoxyisobutylisopropylsilane, dimethoxydiisobutylsilane, dimethoxydicyclopentylsilane and diethoxyisobutylisopropylsilane are noteworthy.

Preferably used catalyst systems are those in which the atomic ratio of aluminum from the aluminum compound to titanium from the titanium-containing solid component is from 1:1 to 800:1, in particular from 2:1 to 200:1, and the molar ratio of the aluminum compound to the electron donor compound used as a cocatalyst is from 1:1 to 100:1, in particular from 2:1 to 80:1. The catalyst components can be introduced into the polymerization system individually in any order or as a mixture of the components.

The polymers a) present in the novel, partially crosslinked plastics materials can be prepared with the aid of such catalyst systems. In a preferred two-stage process, the propylene copolymer (I) is first prepared in a first polymerization stage and the propylene copolymer (II) is then prepared in a second polymerization stage.

The copolymerization of propylene and of the corresponding $C_2$–$C_{10}$-alk-1-enes in the first polymerization stage is usually carried out at from 20 to 40 bar and from 60° to 90° C. and in the course of an average residence time of the reaction mixture of from 1 to 5 hours. Pressures of from 25 to 35 bar, temperatures of from 65° to 85° C. and average residence times of from 1.5 to 4 hours are preferred in the preparation of the propylene copolymer (I). The reaction conditions are preferably chosen so that, in this first polymerization stage, from 0.05 to 2 kg of the propylene copolymer (I) are formed per mmol of the aluminum component. In particular ethylene or but-1-ene or a mixture of these comonomers is used as the $C_2$–$C_{10}$-alk-1-ene. For the preparation of the propylene copolymer (I), the propylene is copolymerized with the comonomers in a manner such that the ratio of the partial pressure of propylene to that of the comonomers is brought to 10:1 to 1000:1, in particular 15:1 to 500:1.

The propylene copolymer (I) formed is discharged from the first polymerization stage together with the catalyst after the end of the reaction and is fed into the second polymerization stage, where the propylene copolymer (II) is prepared.

This is effected in the second polymerization stage by a method in which propylene is polymerized together with one or more $C_2$–$C_{10}$-alk-1-enes in the presence of the propylene copolymer (I) at from 5 to 25 bar and from 30° to 80° C. and in the course of average residence times of the reaction mixture of from 1 to 5 hours. Pressures of from 10 to 20 bar, temperatures of from 40° to 70° C. and average residence times of from 1.5 to 4 hours are preferred. The pressures in the second polymerization stage are usually at least 7, preferably at least 10, bar below those in the first polymerization stage. In particular, ethylene or but-1-ene or a mixture of these comonomers is used as $C_2$–$C_{10}$-alk-1-enes. For the preparation of the copolymer (II), the propylene is copolymerized with the comonomers in a manner such that the ratio of the partial pressure of the propylene to that of the comonomers is brought to 0.5:1 to 20:1, in particular from 0.5:1 to 15:1. By a suitable choice of the polymerization parameters, care should also be taken to ensure that the weight ratio of the monomers reacted in the first polymerization stage to those reacted in the second polymerization stage is from 0.5:1 to 20:1, in particular from 0.6:1 to 10:1.

The melt flow index of the polymer a) obtainable in this manner are from 0.1 to 100, in particular from 0.5 to 50, g/10 min at 230° C. and 2.16 kg, according to DIN 53,735. The melt flow index corresponds to the amount of polymer which is forced, at 230° C. and a weight of 2.16 kg, out of the test apparatus standardized according to DIN 53,735.

The novel, partially crosslinked plastics materials furthermore contain, as a crosslinking agent, an organosilane compound b) of the following formula (I)

$$A_{4-n}SiR_n \qquad (I)$$

where the radicals A are identical or different and are each an acrylate or methacrylate or a vinyl, the radicals R are identical or different and are each $C_1$–$C_8$-alkoxy or $C_1$–$C_8$-acetoxy and n is 1, 2 or 3. Preferably used organosilane compounds b) are those in which n is 3. Among these compounds, 3-methacryloxypropyltrimethoxysilane, vinyltrimethoxysilane and vinyltriethoxysilane are particularly noteworthy. In addition to the organosilane compound b), a small amount of esters of acrylic or methacrylic acid may also be used as further crosslinking agents.

The novel, partially crosslinked plastics materials are obtainable by reacting the polymer a) with the organosilane compound b) in the presence of a free radical initiator and of a condensation catalyst at from 180° to 280° C. and from 1 to 100 bar and in the course of average residence times of the reaction mixture of from 0.2 to 10 minutes. Temperatures of from 190° to 260° C., pressures of from 1 to 60 bar and average residence times of from 0.2 to 5 minutes are preferred. The reaction of the individual components is carried out in the apparatuses usually used in plastics processing for combining substances, for example in drum mixers, in mills, in screw or disk extruders, in roll mills or in kneaders.

Preferably used free radical initiators are organic peroxides or azo compounds. Organic peroxide compounds which have half lives of from 1 to 30 seconds at 210° C. are preferably used. Among these compounds, dicumyl peroxide, monocumyl tert-butyl peroxide, di-tertbutyl peroxide, 2,5-dimethyl-2,5-di-tert-butylperoxyhexane and 2,5-dimethyl-2,5-di-tert-butylperoxyhex-3-yne are particularly noteworthy.

Particularly suitable condensation catalysts are carboxylic acid salts of tin, of iron, of lead, of zinc or of titanium, the carboxylic acid salts of tin being preferred. Compounds such as dibutyltin dilaurate, dibutyltin diacetate and dibutyltin octoate are particularly preferred. Chelates of titanic acid or alkylamines may also be used. To accelerate the reaction of the polymer a) with the organosilane compound b), water or water-eliminating agents, for example hydrates, may furthermore be added to the reaction mixture.

In a preferred embodiment, the novel partially crosslinked plastics material contains, as a further component in addition to the polymer a) and the organosilane compound b), a random ethylene copolymer c) which contains from 5 to 20% by weight of polymerized $C_3$–$C_{10}$-alk-1-enes and whose density at room temperature is from 0.89 to 0.925 g/cm³. A random ethylene copolymer c) which contains from 8 to 20% by weight of polymerized $C_3$–$C_{10}$-alk-1-enes is preferably used. In this context, polymerized $C_3$–$C_{10}$-alk-1-enes are understood as meaning in particular propylene, but-1-ene, pent-1-ene, hex-1-ene, hept-1-ene or oct-1-ene or mixtures of these comonomers, propylene, but-1-ene, hex-1-ene or oct-1-ene being preferably used.

Such random ethylene copolymers are prepared by low pressure polymerization of the comonomers using metal-containing catalysts, for example with the aid of titanium- and aluminum-containing Ziegler catalysts. The polymerization reaction can be carried out using reactors conventionally employed in industry, for example stirred kettles, in the gas phase, in solution or in suspension. In a preferably used process, the ethylene copolymers c) used according to the invention are prepared by gas phase polymerization with the aid of Ziegler catalysts at from 10 to 100 bar and from 30° to 100° C. and in the course of an average residence time of from 0.5 to 5 hours. In this process, the ratio of the partial pressure of ethylene to that of the $C_3$–$C_{10}$-alk-1-enes is brought to 2:1–100:1.

It may also be advisable to add a rubber-like material d) having a Shore A hardness of from 30 to 90 (according to DIN 53,505) to the polymer mixture to be used according to the invention. In the determination of the Shore A hardness, the depth of penetration of a truncated cone into the sample material is measured. Examples of rubber-like materials d) include styrene/butadiene block copolymers, styrene/ethylene/butene terpolymers, acrylate rubbers, ethylene/propylene rubbers, ethylene/propylene/diene rubbers, isoprene rubbers, styrene/isoprene rubbers, polyisobutylene rubbers, ethylene/vinyl acetate copolymers, polyurethane rubbers, nitrile rubbers and natural rubbers. Styrene/ethylene/butene terpolymers, ethylene/propylene rubbers, ethylene/propylene/diene rubbers, polyisobutylene rubbers and acrylate rubbers are preferably used.

This rubber-like material d) as well as the random ethylene copolymer c) can be mixed with the polymer a) either before or after its reaction with the organosilane compound b).

The polymer blend present in the novel, partially crosslinked plastics material preferably contains from 40 to 100 parts by weight of polymer a), from 0 to 60 parts by weight of random ethylene copolymer c) and from 0 to 40 parts by weight of rubber-like material d), the percentages being based on 100 parts by weight. A polymer blend which consists of from 50 to 100 parts by weight of polymer a), from 0 to 30 parts by weight of random ethylene copolymer c) and from 0 to 25 parts by weight of rubber-like material d), the percentages being based on 100 parts by weight, in particularly preferred. In a possible preparation process, the individual components of the polymer blend, i.e. a) and, if required, c) and d), are first mixed in the mixing apparatus, for example in an extruder or in a mill, and are then partially crosslinked by reaction with the organosilane compound b). In another preparation process, the polymer a) is first reacted with the organosilane compound b), after which, if required, c) and d) are added.

For the preparation of the novel, partially crosslinked plastics material, preferably from 0.05 to 5 parts by weight of the organosilane compound b), from 0.001 to 2 parts by weight of the free radical initiator and from 0.001 to 0.1 part by weight of the condensation catalyst are used per 100 parts by weight of the polymer blend of polymer a) and, if required, the random ethylene copolymer c) and the rubber-like material d). Partial crosslinking of the plastics material takes place.

In a particularly preferred preparation process, appropriate amounts of the organosilane compound b), of the free radical initiator, of the condensation catalyst and, if required, of the random ethylene copolymer c) and of the rubber-like material d) are added to the polymer a) immediately after its preparation, in a mixing apparatus connected to the preparation reactor of the copolymer a). After the end of the reaction, the partially crosslinked plastics material is discharged from the mixing apparatus and is separated from volatile starting materials in a shaft dryer connected to said mixing apparatus. The plastics material obtained in this manner can be directly processed further.

By choosing the special polymers a), the organosilane compounds b) and, if required, the random ethylene copolymers c) and the rubber-like materials d), partially crosslinked plastics materials which have in particular a low sealing temperature and reduced white fracture are obtained. Furthermore, their joint line strengths for use in injection molding and the deep drawing properties of the films obtained from these polymers are improved. The novel partially crosslinked plastics materials are obtainable in a simple manner, since both the grafting with the organosilane compound b) and the subsequent partial crosslinking can be carried out in one preparation step. They can also be used together with the additives usually employed in plastics technology, for example stabilizers, flameproofing agents, plasticizers, nucleating agents or colorants.

The novel, partially crosslinked plastics materials have relatively good processibility and are therefore particularly suitable as materials for injection molding, blow molding, extrusion and the preparation of foams. They can be used for the production of moldings, films and coating materials.

EXAMPLES

Examples 1–6 and Comparative Examples A–D were carried out in a twin-screw extruder from Berstorff, having a length/diameter ratio of 33. The polymers a) used were fed into the twin-screw extruder in the form of grit or granules and were melted there with the particular organosilane compound b) used, the free radical initiator and the condensation catalyst.

In Examples 4, 5 and 6, a random ethylene copolymer c) and a rubber-like material d) were present in addition to the polymers a). In Examples 5 and 6, the polymers c) and d) were introduced into the twin-screw extruder after the partial crosslinking of the polymer a).

Example 1

100 parts by weight of a polymer a) of 87% by weight of a propylene copolymer containing 2.6% by weight of polymerized ethylene and 13% by weight of a propylene copolymer having 60% by weight of polymerized ethylene were mixed in a twin-screw extruder with 0.8 part by weight of 3-methacryloxypropyltrimethoxysilane, 0.1 part by weight of 2,5-dimethyl-2,5-di-tert-butylperoxyhexane and 0.02 part by weight of dibutyltin dilaurate, and the mixture was granulated. The melt flow index of the polymer a) was 2.6 g/10 min at 230° C. and 2.16 kg, according to DIN 53,735. Mixing was carried out at 220° C. and 20 bar in the course of an average residence time of 30 seconds. Thereafter, the mixture was discharged from the twin-screw extruder and was then processed with the addition of water at 90° C. for 16 hours.

Table 1 shows the corresponding values for the resulting partially crosslinked plastics materials with respect to the melt flow index, the sealing temperature and the joint line strength.

Comparative Example A

The polymer a) used in Example 1 was granulated in the twin-screw extruder, without a crosslinking reaction but under otherwise identical conditions.

Table 1 shows the corresponding values for this polymer a) with respect to the melt flow index, the sealing temperature and the joint line strength.

Comparative Example B 100 parts by weight of a propylene polymer of 55% by weight of a propylene homopolymer and 45% by weight of a propylene copolymer containing 51% by weight of polymerized ethylene and having a melt flow index of 2.1 g/10 min at 230° C. and 2.16 kg, according to DIN 53,735, were mixed in a twin-screw extruder with 0.6 part by weight of vinyltrimethoxysilane, 0,044 part by weight of 2,5-dimethyl-2,5-di-tert-butylperoxyhexane and 0.03 part by weight of dibutyltin dilaurate, and the mixture was granulated. Mixing and the subsequent working up were carried out as described in Example 1.

Table 2 shows the corresponding values for this polymer with respect to the melt flow index, the sealing temperature, the white fracture and the Shore D hardness.

Example 2

100 parts by weight of a polymer a) of 55% by weight of a propylene copolymer containing 2.5% by weight of polymerized ethylene and 45% by weight of a propylene copolymer containing 60% by weight of polymerized ethylene were mixed in a twin-screw extruder with 0.2 part by weight of vinyltrimethoxysilane, 0.02 part by weight of 2,5-dimethyl-2,5-di-tert-butylperoxyhexane and 0.01 part by weight of dibutyltin dilaurate, and the mixture was granulated. The melt flow index of the polymer a) was 0.9 g/10 min at 230° C. and 2.16 kg, according to DIN 53,735. Mixing was carried out at 220° C. and at 20 bar in the course of an average residence time of 30 seconds. Thereafter, the mixture was discharged from the twin-screw extruder and was then processed with the addition of water at 90° C. for 16 hours.

Table 2 shows the corresponding values for the resulting partially crosslinked plastics materials with respect to the melt flow index, the sealing temperature, the white fracture and the Shore D hardness.

Example 3

100 parts by weight of a polymer a) of 54% by weight of a propylene copolymer containing 2.6% by weight of polymerized ethylene and 46% by weight of a propylene copolymer containing 47% by weight of polymerized ethylene were mixed in a twin-screw extruder with 0.4 part by weight of vinyltrimethoxysilane, 0.04 part by weight of 2,5-dimethyl-2,5-di-tert-butylperoxyhexane and 0.02 part by weight of dibutyltin dilaurate, and the mixture was granulated. The melt flow index of the polymer a) was 1.6 g/10 min at 230° C. and 2.16 kg, according to DIN 53,735. Mixing was carried out at 220° C. and at 20 bar in the course of an average residence time of 30 seconds. Thereafter, the mixture was discharged from the twin-screw extruder and was then processed with the addition of water at 90° C. for 16 hours.

Table 2 shows the corresponding values for the resulting partially crosslinked plastics materials with respect to the melt flow index, the sealing temperature, the white fracture and the Shore D hardness.

Example 4

77.5 parts by weight of the polymer a) used in Example 3 were crosslinked with 7.5 parts by weight of a random ethylene copolymer c) containing 16% by weight of polymerized but-1-ene and having a melt flow index of 1.4 g/10 min at 230° C. and 2.16 kg, according to DIN 53,735, and a density of 0.90 g/cm³, and 15 parts by weight of a polyisobutylene as rubber-like material d), having a melt flow index of 0.3 g/10 min at 190° C. and 2.16 kg, according to DIN 53,735 and a Shore A hardness of 30 in a twin-screw extruder, and the mixture was granulated. Crosslinking was carried out with the aid of 0.6 part by weight of vinyltrimethoxysilane, 0.06 part by weight of 2,5-dimethyl-2,5-di-tert-butylperoxyhexane and 0.03 part by weight of dibutyltin dilaurate. In addition, the mixture contained 0.25 part by weight of carbon black. Crosslinking was carried out at 220° C. and 20 bar in the course of an average residence time of 30 seconds. Thereafter, the mixture was discharged from the twin-screw extruder and then processed with the addition of water at 90° C. for 16 hours.

An extruded film having a width of 420 mm and a thickness of 0.3 mm was produced by the cast film method in a slot die film extrusion unit at a melt temperature of about 240° C. and a melt pressure of about 110 bar using the resulting partially crosslinked polymer blend.

Table 3 shows the corresponding values for the resulting partially crosslinked plastics materials with respect to the melt flow index, the Shore D hardness and the sag on heating the film.

Comparative Example C

The mixture used in Example 4 consisting of a polymer a), the random ethylene copolymer c) and the polyisobutylene d) was granulated together with the corresponding amount of carbon black similarly to novel Example 4 and was worked up but not crosslinked. Furthermore, an extruded film having a width of 420 mm and a thickness of 0.3 mm was produced similarly to Example 4.

Table 3 shows the corresponding values for this polymer with respect to the melt flow index, Shore D hardness and the sag on heating the film.

Example 5

70 parts by weight of the polymer a) used in Example 2 were granulated with 10 parts by weight of a random ethylene copolymer c) containing 16% by weight of polymerized but-1-ene and having a melt flow index of 1.4 g/10 min at 230° C. and 2.16 kg, according to DIN 53,735, and a density of 0.90 g/cm³ and 20 parts by weight of an ethylene/propylene copolymer as rubber-like material d), having a propylene content of 25% by weight, a melt flow index of 3 g/10 min at 230° C. and 10 kg, according to ASTM D 1238, and a Shore A hardness of 84, in a twin-screw extruder. First the polymer a) was crosslinked then c) and d) were added. Crosslinking was carried out with the aid of 0.2 parts by weight of vinyltrimethoxysilane, 0.02 part by weight of 2,5-dimethyl-2,5-di-tert-butylperoxyhexane and 0.01 part by weight of dibutyltin dilaurate. In addition, the mixture contained 0.25 part by weight of carbon black. Crosslinking was carried out at 220° C. and 20 bar in the course of an average residence time of 30 seconds. Thereafter, the mixture was discharged from the twin-screw extruder and then processed with the addition of water at 90° C. for 16 hours.

An extruded film having a width of 420 mm and a thickness of 0.3 mm was produced by the cast film method in a slot die film extrusion unit at a melt temperature of about 240° C. and a melt pressure of about 110 bar using the resulting partially crosslinked polymer blend.

Table 4 shows the corresponding values for the resulting partially crosslinked plastics materials with respect to the melt flow index, the Shore D hardness and the relationship between temperature and homogeneity in the deep drawing experiment.

Comparative Example D

The mixture used in Example 5 and consisting of the polymer a), the random ethylene copolymer c) and the rubber-like material d) was granulated together with the corresponding amount of carbon black similarly to novel Example 5 and was worked up but not crosslinked. Furthermore, an extruded film having a width of 420 mm and a thickness of 0.3 mm was produced similarly to Example 5.

Table 4 shows the corresponding values for this polymer with respect to the melt flow index, the Shore D hardness and the relationship between temperature and homogeneity in the deep drawing experiment.

Example 6

70 parts by weight of the polymer a) used in Example 3 were granulated with 10 parts by weight of a random ethylene copolymer c) containing 16% by weight of polymerized but-1-ene and having a melt flow index of 1.4 g/10 min at 230° C. and 2.16 kg, according to DIN 53,735, and a density of 0.90 g/cm$^3$ and 20 parts by weight of an ethylene/propylene copolymer as rubber-like material d), having a propylene content of 25% by weight, a melt flow index of 3 g/10 min at 230° C. and 10 kg, according to ASTM D 1238, and a Shore A hardness of 84, in a twin-screw extruder. First the polymer a) was crosslinked then c) and d) were added. Crosslinking was carried out with the aid of 0.4 part by weight of vinyltrimethoxysilane, 0.04 part by weight of 2,5-dimethyl2,5-di-tert-butylperoxyhexane and 0.02 part by weight of dibutyltin dilaurate. In addition, the mixture contained 0.25 part by weight of carbon black. Crosslinking was carried out at 220° C. and 20 bar in the course of an average residence time of 30 seconds. Thereafter, the mixture was extruded from the twin-screw extruder and then processed with the addition of water at 90° C. for 16 hours.

An extruded film having a width of 420 mm and a thickness of 0.3 mm was produced by the cast film method in a slot die film extrusion unit at a melt temperature of about 240° C. and a melt pressure of about 110 bar using the resulting partially crosslinked polymer blend.

Table 4 shows the corresponding values for the resulting partially crosslinked plastics materials with respect to the melt flow index, the Shore D hardness and the relationship between temperature and homogeneity in the deep drawing experiment.

TABLE 1

Properties of the polymers obtained

| | Example 1 | Comparative Example A |
|---|---|---|
| Melt flow index[a] [g/10 min] | 7.2 | 1.3 |
| Sealing temperature[b] DSC melting point [°C.] | 146 | 148 |
| Elongation at break of the joint line[c] | 28 | 9 |

[a] According to DIN 53,735, at 230° C. and 2.16 kg
[b] Determined in a DSC melting point apparatus at a heating rate of 20° C./min
[c] For the elongation test of the joint line, dumb bells were produced which were injection molded from both sides and had a joint line in the middle, transverse with respect to the longitudinal axis. The dumb bell corresponded in its dimensions to the standard had a thickness of 3 mm. This dumb bell was produced at 250° C. and at a flow front speed of 200 mm/sec.
The elongation at break of the joint line in the dumb bells produced in this manner were determined by tension experiments according to DIN 53,457 at 23° C.

TABLE 2

Properties of the polymers obtained

| | Example 2 | Example 3 | Comparative Example B |
|---|---|---|---|
| Melt flow index[a] [g/10 min] | 0.28 | 0.20 | 0.33 |
| Sealing temperature[b] DSC melting point [°C.] | 146 | 146 | 160 |
| Shore D hardness[c] | 42 | 43 | 50 |
| White fractures[d] | 0.8 | 0.7 | 6.6 |

[a] According to DIN 53,735, at 230° C. and 2.16 kg
[b] Determined in a DSC melting point apparatus at a heating rate of 20° C./min
[c] According to DIN 53,505
[d] Determination of the white fracture:
The white fracture was determined with the aid of a falling dart apparatus according to DIN 53,443 Part 1, a falling dart having a mass of 250 g, an impact element with a diameter of 5 mm and a cap radius of 25 mm being used. The height of fall was 50 cm. The test specimen used was an injection molded circular disk having a diameter of 60 mm and a thickness of 2 mm.
The test specimen was injection molded at a melt temperature of 250° C. and a mold surface temperature of 30° C. The test was carried out at 60° C., each test specimen being subjected to only one impact test. The test specimen was first placed on a support ring without the latter being clamped, and the falling dart was then released. 5 test specimens were tested in each case to obtain the mean value.
The diameter of the visible white fracture mark is stated in mm and was determined by measuring it on the side of the circular disk opposite the impact, in the direction of flow and at right angles thereto, and determining the mean value from the two values.

TABLE 3

Properties of the polymers obtained

| | Example 4 | Comparative Example C |
|---|---|---|
| Melt flow index[a] [g/10 min] | 0.2 | 0.7 |
| Shore D hardness[b] | 36 | 36 |
| Sag[c] [mm] at film surface temperature | | |
| 180° C. | 65 | 110 |
| 198° C. | 77 | 143 |

[a] According to DIN 53,735, at 230° C. and 2.16 kg
[b] According to DIN 53,505
[c] In a conventional deep drawing apparatus, the particular film was heated to the corresponding film surface temperature by means of infrared heating from above. The particular film surface temperature was determined with the aid of a PM3 infrared temperature measuring apparatus from Raynger. The film was clamped in a frame measuring 500 mm × 300 mm.
A weight of 50 g was present on the film during the measurement and, by means of a tension apparatus, moved a pointer which indicated the sag during the heating.

TABLE 4

Properties of the polymers obtained

| | Example 5 | Example 6 | Comparative Example D |
|---|---|---|---|
| Melt flow index[a] | 0.6 | 2.5 | 2.0 |
| Shore D hardness[b] | 32 | 26 | 35 |
| Thickness distribution[c] [μm] | | | |
| at 180° C. | | | |
| bottom | 118 | 103 | 166 |
| middle | 91 | 94 | 89 |
| top | 89 | 94 | 83 |
| at 190° C. | | | |

TABLE 4-continued

| Properties of the polymers obtained | | | |
|---|---|---|---|
| | Example 5 | Example 6 | Comparative Example D |
| bottom | 110 | 106 | 121 |
| middle | 94 | 94 | 91 |
| top | 94 | 94 | 95 |

*a)* According to DIN 53,735, at 230° C. and 2.16 kg
*b)* According to DIN 53,505
*c)* The film was heated from above to the predetermined surface temperature (180° C. or 190° C.) by means of an infrared heater. The film surface temperature was determined using a PM3 measuring apparatus from Raynger. The heating process lasted for from about 20 to 60 seconds. Thereafter, the heater was removed and the film was molded by moving a truncated cone upward at a speed of 7.5 m/sec in a conventional deep drawing machine.
An elongation of 300% was produced along the flank. The thickness of the film at the bottom (10% of the extended distance), in the middle (50% of the extended distance) and at the top close to the upper edge (84% of the extended distance) was used as a measure of the uniformity of deformation. The high uniformity of deformation means that the thicknesses at the bottom, middle and at the top remain substantially the same.
The deformation becomes more uniform with increasing film surface temperature.

A comparison of the novel Examples 1 to 6 with the Comparative Examples A to D shows that the novel partially crosslinked polymers have a lower sealing temperature, a smaller tendency to undergo white fracture and an improved joint line strength. In addition, the films obtained from the novel, partially crosslinked polymers have better deep drawing properties (less sag and more uniform thickness distribution) than those of Comparative Examples A to D.

We claim:
1. A partially crosslinked plastic material having a melt flow index of from 0.1 to 100 g/10 min. at 230° C. and under a weight of 2.16 kg, comprising
   a) from 40 to 100 parts of polymer a) which is a polymer of from 25 to 97% by weight of a propylene copolymer (I) which contains 82–99.8% by weight propylene and from 0.2 to 12% by weight of polymerized $C_2$–$C_{10}$-alk-1-enes other than propylene and of from 3 to 75% by weight of a further propylene copolymer (II) which contains 20 to 85% by weight propylene and from 15 to 80% by weight of polymerized $C_2$–$C_{10}$-alk-1-enes other than propylene;
   b) an organosilane compound having the formula

where the radicals A are identical or different and are each an acrylate or methacrylate or vinyl, the radicals R are identical or different and are each $C_1$–$C_8$-alkoxy or $C_1$–$C_8$-acetoxy and n is 1, 2 or 3;
   c) 0–60 parts by weight, based on 100 parts by weight of a), of a random ethylene copolymer containing ethylene and from 5–20% by weight based on the weight of c) of polymerized $C_3$–$C_{10}$-alk-1enes and having a density at room temperature of from 0.89 to 0.925 g/cm$^3$; and
   d) 0–40 parts by weight, based on 100 parts by weight of a), of a rubber material having a share A hardness of from 30 to 90;
   wherein the partially crosslinked plastic material is obtained by
     1) preparing polymer a) in a preparation reactor, and
     2) immediately after the preparation of polymer a), mixing polymer a) with the organosilane compound b), a free radical initiator, a condensation catalyst, the random ethylene copolymer c), when present, and the rubber material d), when present, in a mixing apparatus connected to the preparation reactor at a temperature of from 180° to 280° C., at a pressure of from 1 to 100 bar and for an average residence time of from 0.2 to 10 minutes.

2. A partially crosslinked plastic material of claim 1, wherein component c) is present.

3. A partially crosslinked plastic material of claim 1, wherein component d) is present.

4. A partially crosslinked plastic material of claim 1, wherein from 0.05 to 5 parts by weight of component b), from 0.001 to 2 parts by weight of the free radical initiator, and from 0.001 to 0.1 part by weight of the condensation catalyst are used per 100 parts by weight of the sum of components a), c) and d).

5. A partially crosslinked plastic material of claim 1, wherein the polymer a) consists of from 35 to 95% by weight of a propylene copolymer (I) which contains 88 to 99.8% by weight propylene and from 0.2 to 12% by weight of polymerized $C_2$–$C_{10}$-alk-1enes other than propylene and of from 5 to 65% by weight of a propylene and from 2.0 to 75% by weight of polymerized $C_2$–$C_{10}$-alk-1enes other than propylene.

6. A partially cross-linked plastic material of claim 1, wherein, in the organosilane component b), n is 3.

7. A partially crosslinked plastic material of claim 1, wherein component a) consists of 55% by weight of a propylene copolymer (I) which contains 97.5% by weight of propylene and 2.5% by weight of polymerized ethylene and 45% by weight of a propylene copolymer which contains 40% by weight of propylene and 60% by weight of polymerized ethylene, and wherein component b) is vinyltriethoxysilane.

* * * * *

UNITED STATES PATENT AND TRADEMARK OFFICE
CERTIFICATE OF CORRECTION

PATENT NO.: 5,371,144

DATED: December 6, 1994

INVENTOR(S): BROSIUS et al.

It is certified that error appears in the above-identified patent and that said Letters Patent is hereby corrected as shown below:

Column 14, claim 1, line 8, "share" should be --shore--.

Column 14, claim 7, line 51, "vinyltriethoxysilane" should be --vinyltrimethoxysilane--.

Signed and Sealed this

Sixteenth Day of May, 1995

*Attest:*

BRUCE LEHMAN

*Attesting Officer*      *Commissioner of Patents and Trademarks*